(12) United States Patent
Jiang et al.

(10) Patent No.: US 6,519,457 B1
(45) Date of Patent: Feb. 11, 2003

(54) METHODS AND SYSTEMS FOR STANDARDIZING INTERBASE STATION COMMUNICATIONS

(75) Inventors: Jianping Jiang, Richardson, TX (US); Azeem Ahmad, Dallas, TX (US); Jerri L. Turner-Harris, Garland, TX (US); Baji Edupuganty, Plano, TX (US); William Edward Illidge, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 98 days.

(21) Appl. No.: 09/669,097

(22) Filed: Sep. 25, 2000

Related U.S. Application Data

(62) Division of application No. 09/056,370, filed on Apr. 7, 1998.
(60) Provisional application No. 60/043,220, filed on Apr. 9, 1997.

(51) Int. Cl.⁷ .................................................. H04Q 7/20
(52) U.S. Cl. ........................................ 455/442; 455/561
(58) Field of Search ................................. 455/422, 442, 455/432, 436, 438, 439, 524, 525, 561; 370/329, 338, 400, 406, 411, 413, 422, 466

(56) References Cited

U.S. PATENT DOCUMENTS

| | | | |
|---|---|---|---|
| 5,418,838 A | 5/1995 | Havermans et al. | 379/60 |
| 5,479,409 A | 12/1995 | Dupuy et al. | 370/95.3 |
| 5,682,416 A | 10/1997 | Schmidt et al. | 379/58 |
| 5,794,149 A | 8/1998 | Hoo | 455/438 |
| 5,799,252 A * | 8/1998 | Nakagoshi et al. | 455/524 |
| 5,884,187 A | 3/1999 | Ziv et al. | 455/522 |
| 5,930,714 A | 7/1999 | Abu-Amara et al. | 455/442 |
| 5,940,762 A | 8/1999 | Lee et al. | 455/442 |
| 5,956,641 A | 9/1999 | Bruckert et al. | 455/442 |
| 5,991,625 A | 11/1999 | Vanderpool | 455/436 |

* cited by examiner

Primary Examiner—Nay Maung
(74) Attorney, Agent, or Firm—Carr Law Firm, L.L.P.

(57) ABSTRACT

Disclosed is an apparatus and method whereby a direct base station to base station communication link is used to bypass message transmissions to an MSC in establishing a soft handoff. By using a standardized protocol for both traffic and signaling messages flowing directly from base station to base station, communications with foreign manufacturers base station equipment may be readily accomplished.

10 Claims, 5 Drawing Sheets

METHODS AND SYSTEMS FOR STANDARDIZING INTERBASE STATION COMMUNICATIONS

This is application is a divisional application of co-pending patent application Ser. No. 09/056,370 to Jiang, et al. entitled "Methods and Systems for Standardizing Inter Base Station Communications", filed on Apr. 7, 1998, which claims the benefit of U.S. Provisional Application No. 60/043,220, filed Apr. 9, 1997.

TECHNICAL FIELD

The present invention relates in general to soft handoffs and in particular to methods and systems for establishing soft handoffs between two base stations (BSs) using a direct BS to BS link.

BACKGROUND

When a mobile station (MS), in a cellular communication system, crosses from one cell to another adjacent cell a process designated as handoff is initiated.

Handoff is the process by which a new air interface channel between a mobile station and a base station is established.

There are several types of handoff in the wireless communication industry. A "hard handoff" is a handoff which requires a mobile station to tune its radio equipment or to reestablish synchronization. A "soft handoff" is a handoff that does not require the mobile station to tune its radio equipment or to reestablish synchronization and that uses the same frame selection function for (and voice trans-coding function, if this is a voice call) in the network for both the old and new air interface channels. Other types of handoffs, such as a semi soft handoff, are not pertinent to an understanding of the present invention. At the present time, only code division multiple access (CDMA) wireless communication systems are capable of accomplishing soft handoffs.

In a CDMA wireless communication system, using cellular transmission technology, the process of establishing a soft handoff from the time an MS sees a new pilot signal, received from a nearby base transceiver station (BTS) defining another cell, to the time an MS sends a handoff completion message can be segregated into at least three phases.

Phase 1 may be defined as occurring from the time the MS sees a new pilot to the time that the pilot strength exceeds a predetermined threshold and may be referred to as the defection phase. Phase 2 may be defined as occurring between the time an MS sends a pilot strength measurement (PSM) message until it receives a handoff direction message and may be referred to as the establishing phase (when successful). Phase 3 may be defined as the time from when an MS receives a handoff direction message to the time the MS sends a handoff completion message and may be referred to as the completion phase.

As is well-known in the art, many standards are used by the communication industry to define functional standards by which communication equipment will operate so that equipment from various manufacturers may compatibly inter-operate. One such standard is IS-95 Revision A entitled "Mobile Station—Base Station Compatibility Standard for Dual-Mode Wideband Spread Spectrum Cellular Systems; May, 1995". Another standard is IS-634 Rev A ballot version dated Apr. 20, 1997 entitled "MSC BS Interface for Public Wireless Communication" that among other items defines an "A3" communication link between base station entities. A further standard mentioned in this document is IS-41-C entitled "Cellular Radiotelecommunications Intersystem Operations; 1996". Each of these standards are incorporated herein by reference.

The IS-634 standard has defined and standardized communications between a mobile switching center (MSC) and a BS by industry agreement such that different manufacturers equipment could be combined into a composite cellular system by a user. However this standard has not previously attempted to standardize any signaling messages between base stations. Thus, signaling messages bound from a source base station to a target base station, must be first relayed to an MSC in a standardized manner and protocol before being received by the target base station.

To support soft handoff of an MS moving from one cell to another, adjacent cells must operate at the same frequency. Once an MS detects a new pilot, the MS may experience same frequency interference from adjacent cells. In accordance with the standards of IS-95, 12 consecutive bad frames detected by an MS may cause the MS to drop a call. The total network processing time that may cause a call to be dropped is primarily a function of the phase 2 time period. At this time the received signal has already degraded enough that a handoff has been requested. This typically means that the MS is still moving away from its signal source. Thus the degradation of received signal quality, before handoff completion, may result in the occurrence of 12 consecutive bad frames as detected by the MS.

One prior art system used 12 steps and including the transmission of 12 messages for an intra-system inter-BS handoff during phase 2. The series of setup and request messages went from the MS, to the serving BTS, to the selection/distribution unit (SDU), the serving base station controller (BSC), the mobile switching center (MSC), the target BSC, and the target BTS. The response messages came from the target BTS to the target BSC, the MSC, the serving BSC, the SDU and finally the serving BTS.

For an inter-system handoff, 14 steps were completed because of the extra MSC involved in both directions.

It takes time to successfully transmit a message and to process the message after receipt. It will be apparent that the time required to complete the referenced 12 steps must occur before the MS has moved to a position such that the quality of the signal received by the MS degrades to a point whereby the MS detects 12 consecutive bad frames. This is especially true when the MSC is involved in many administrative tasks other than call processing.

Thus a system whereby the number of steps involved and the number of messages transmitted could be reduced for the establishment process of phase 2 would lessen the chances of a call being dropped due to extensive time required to complete this phase. The elimination of the MSC from the message path, even where there was no reduction in number of steps involved, due to a required addition of dedicated processing entities, would also reduce the time required to complete phase 2 in some circumstances.

It would further be desirable, if base stations, whether identical or made by different manufacturers, could communicate directly with one another to establish a soft handoff of an MS across cellular boundaries of communication cells managed by different base stations.

SUMMARY OF THE INVENTION

The present invention comprises providing an enhanced communication link directly between source and target base stations. This enhanced link permits the transmission of both signaling and voice information thereby removing the involvement of the MSC from the soft handoff establishing phase process.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
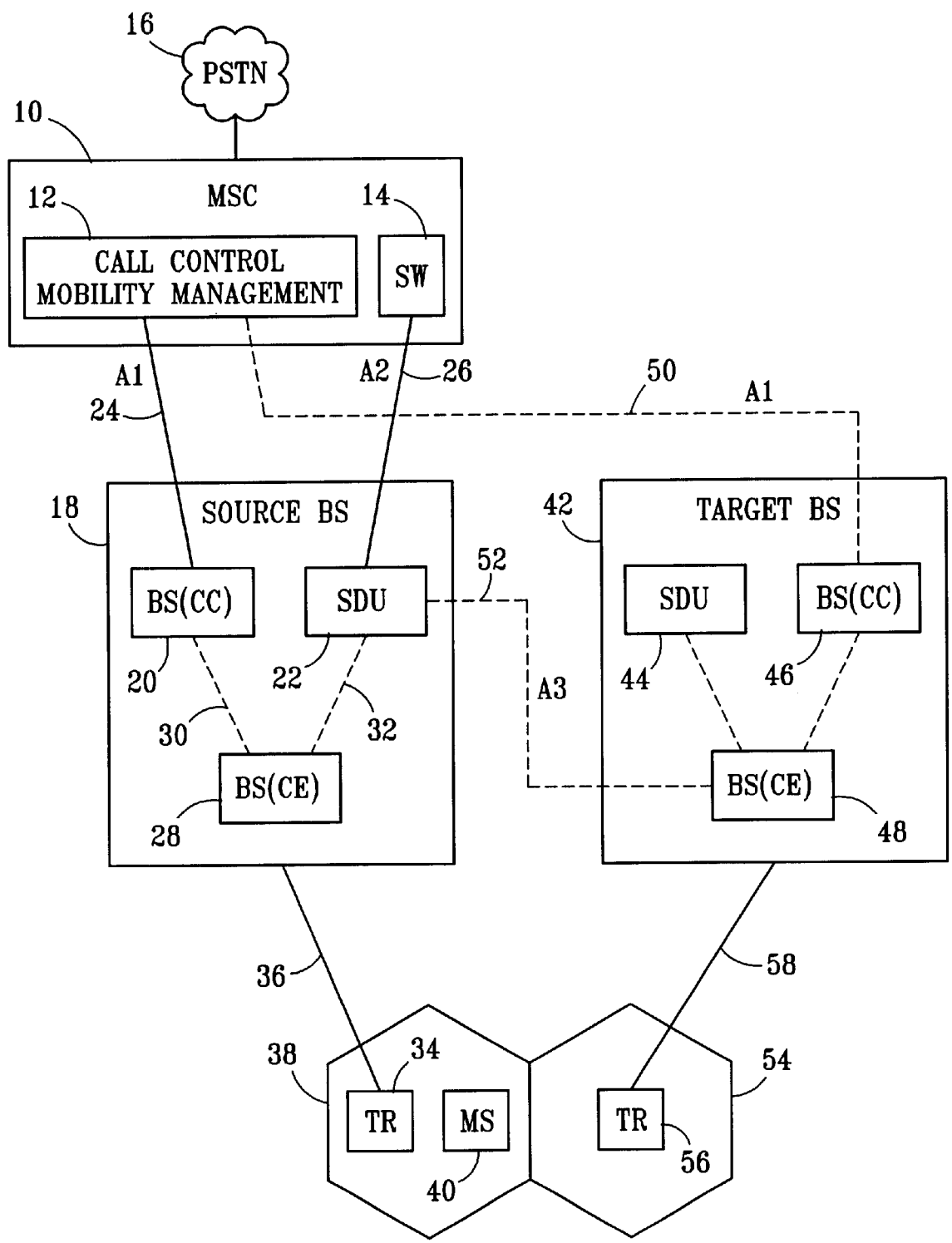
FIG. 1 is a block diagram of a prior art system used to describe an intra-system inter-BS soft handoff of an MS from one base station to a second base station.

In FIG. 1 a block 10 comprises a mobile switching center (MSC). Block 10 comprises many entities but only two entities are shown. These are a call control mobility management block 12 and a switch 14. A cloud 16, internally labeled PSTN for public service telephone network, is connected to supply signals to and from MSC 10. A block 18 is further labeled as SOURCE BS (base station). Within block 18 is a block 20 comprising a call control portion of the base station. A block 22 comprises a selection/distribution unit (SDU). Proprietary signals are passed back and forth between block 20 and block 22 in a manner not shown. A communication link 24, which is further labeled A1, allows the passage of messages between block 20 and the call control mobility management block 12. A further communication link 26, further labeled A2, allows the exchange of voice traffic between SDU block 22 and the switch 14. Communication links A1 and A2 are standardized protocol links and are defined in the referenced IS-634 standard. A further block 28 within base station 18 comprises a channel element portion of the base station and is internally labeled BS(CE). Proprietary communication links 30 and 32 provide for the transmission of the signals between block 28 and the blocks 20 and 22. As will be realized by those skilled in the art the block 18 comprises not only the base station controller function but in addition provides the function of a base transceiver system. To reduce the complexity of the FIGURE, only those entities within block 18 that are pertinent to the present invention have been detailed. A transmitter 34 is shown connected to the base station 18 by a communication link 36. A hexagon 38 is representative of the geographical area that signals can be a reliably transmitted between transmitter 34 and a communicating mobile station. A mobile station 40 is shown a within the hexagon 38. As is known to those skilled in the art, the area 38 is typically defined as a cell. A target base station is shown as a block 42. Block 42 includes a SDU 44, a call control block 46 and a channel element block 48. A communication link 50 provides for the transmission of messages between call control mobility management block 12 and the call control block 46. Communication link 50 is further labeled as A1. A communication link 52 provides for the transmission of voice signals between SDU 22 and channel element block 48. Link 52 is further labeled as A3. A hexagonal block 54 defines a communication cell controlled by base station 42. Within cell 54 is a transmitter 56 connected by communication link 58 to the base station 42.

Figure 2:
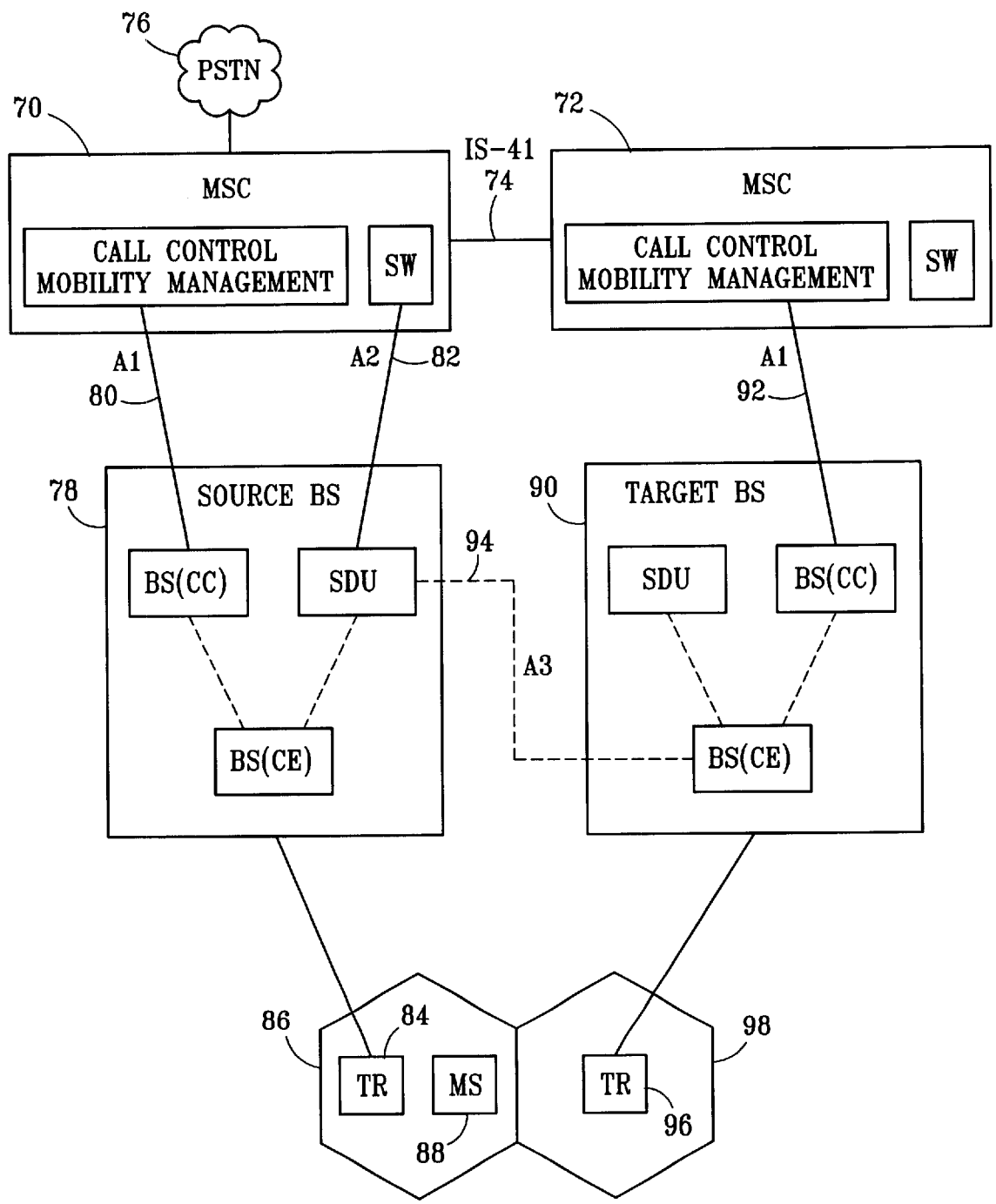
FIG. 2 is a block diagram of a prior art system used to describe an inter-system inter-BS soft handoff of an MS from one base station in a first system to a base station in a second system.

In FIG. 2 an MSC 70 is shown connected to a further MSC 72 by a communication link 74. The link 74 transmits signals in accordance with industry standards as prescribed by IS-41. A cloud 76, representing the public switched telephone network is shown communicating with MSC 70. A source base station 78 communicates with MSC 70 by communication links 80 and 82. Communication link 80 is further labeled A1. Communication link 82 is further labeled A2. These two communication links transmit signals in accordance with industry standards as prescribed by IS-634. The base station 78 is further connected to a transmitter block 84 defining a cell represented by a designator 86. Within cell 86 is a mobile station 88. The target base station 90 is shown connected to MSC 72 by a communication link 92. Communication link 92 is further labeled A1 and conforms to IS-634. A communication link 94 provides for the transmission of voice signals between base station 78 and base station 90. Typically these voice signals are transmitted in the form of pulse code modulated (PCM) signals. Communication link 94 is given the further designation of A3. The base station 90 is shown controlling a transmitter 96 defining a communication cell further designated as 98 which is adjacent cell 86. Each of the blocks 70, 72, 78 and 90 are shown in abbreviated format but contain the same elements as has been shown and described in connection with FIG. 1.

Figure 3:
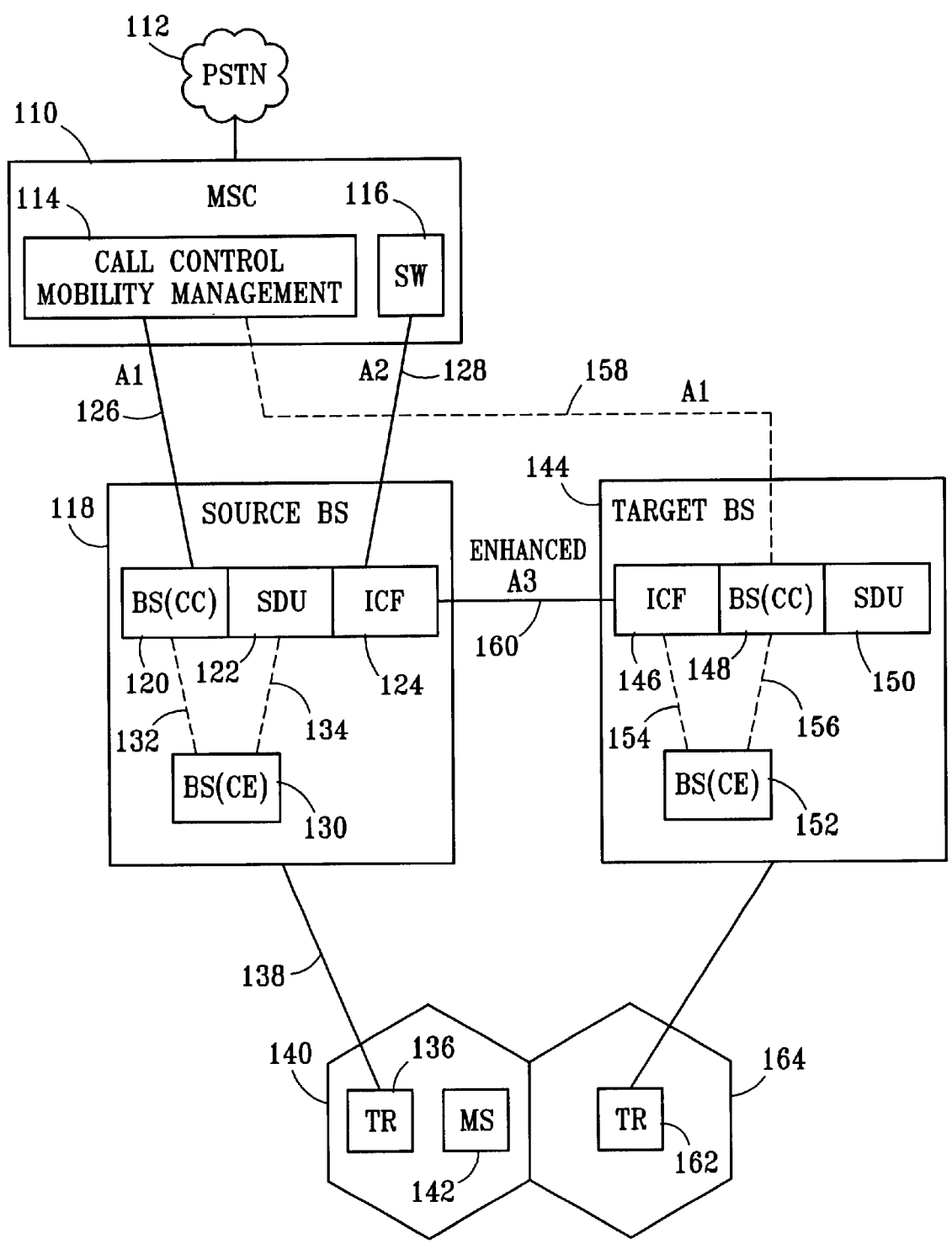
FIG. 3 is a block diagram used to describe an intra-system inter-BS soft handoff of an MS from one base station to a second base station where the present invention is incorporated.

In FIG. 3 an MSC block is designated as 110. A cloud 112, representing the public switched telephone network, is connected to communicate with MSC 110. Within block 110 there is shown a block 114 providing call control mobility management. There is a further block 116 providing a switching function. A source base station 118 is shown including a base station call control block 120, and SDU 122 and interconnection function (ICF) block 124. Call control block 120 communicates with block 114 via a communication link 126 further labeled as A1. SDU 122 communicates with block 116 via a communication link 128. Link 128 is further labeled A2. A base station channel element block 130 is also shown within block 118. Block 130 communicates with blocks 120 and 122 via proprietary communication links designated as 132 and 134 respectively. A transmitter block 136 is shown connected to base station block 118 via a communication link 138. A hexagonal cell 140 represents the geographical area of reliable communication between transmitter 136 and any active mobile stations. A mobile station 142 is shown within cell 140.

A target base station is designated as 144 and contains at least an ICF 146, a base station call control block 148 and an SDU 150. A base station channel element 152 is also shown. The channel element block 152 communicates with ICF 146 via a proprietary communication link 154 and communicates with call control block 148 via a link 156. Communication is provided between call control block 148 and the call control mobility management block 114 via a link 158 which is further labeled A1. A link 160 provides communication between ICF 124 of the source BS 118 and ICF 146 of the target BS 144. Link 160 is further labeled as enhanced A3 and includes signalling messages outside the protocol definitions of IS-634 as it existed in April 1997. While link 160 is shown as a single line in the drawing, this enhanced link is intended to provide both voice and signaling messages between the source and target BS. Thus this link may be a single path transmitting voice or data in the form of traffic packets that are readily distinguishable by the receiving entity from signaling data packets. The link may also comprise two or more paths where one path transmits only traffic information and the one or more other paths transmit signaling information. A transmitter block 162 is connected to target base station 144 and a hexagonal block 164 defines a cell covered by the transmissions from transmitter 162.

As indicated specifically in connection with some previous figures and implied in connection with the remaining figures, the A1 and A2 links shown comply with established IS-634 standards.

Figure 4:
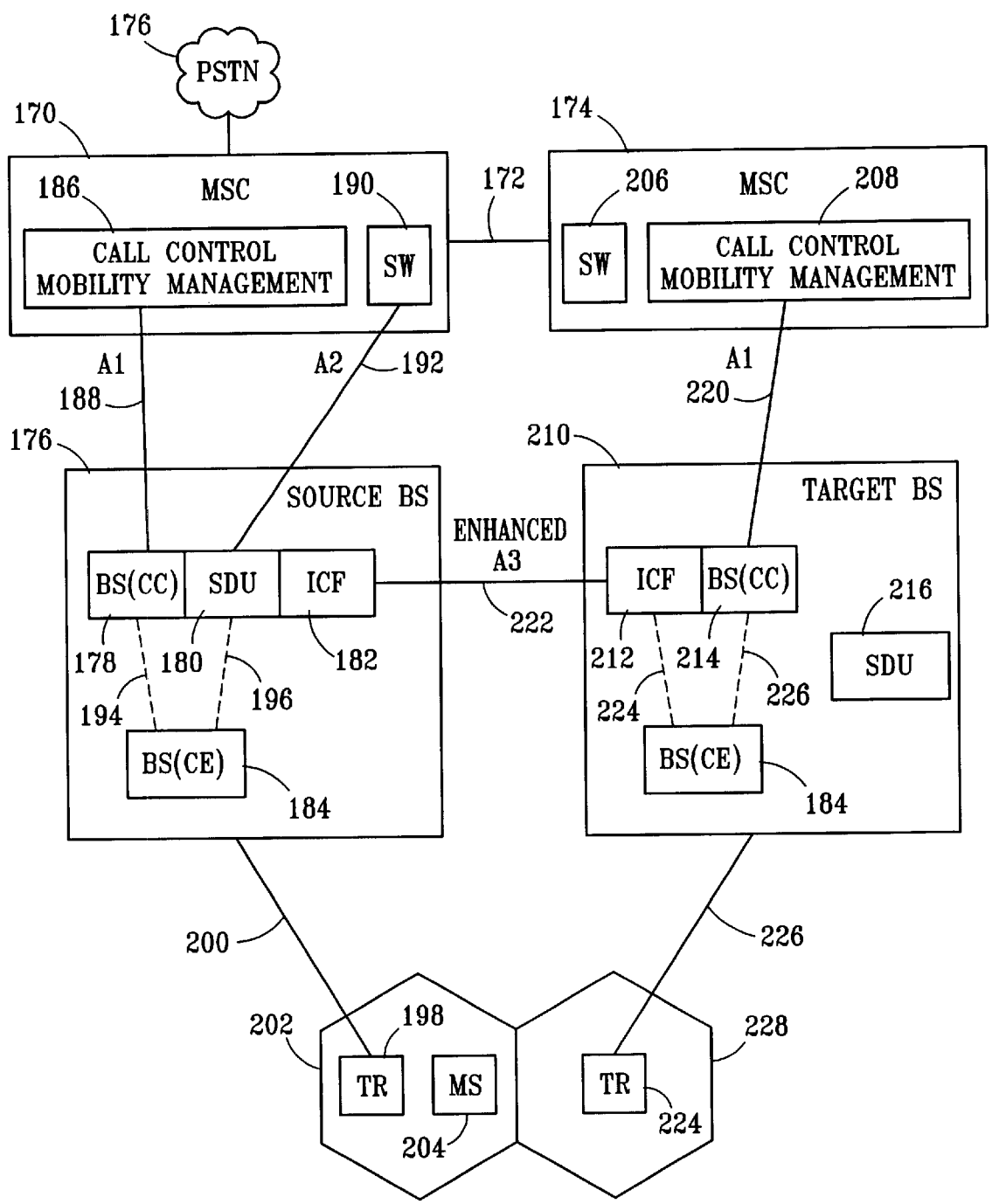
FIG. 4 is a block diagram used to describe an inter-system inter-BS soft handoff of an MS from one base station to a second base station where the present invention is incorporated.

In FIG. 4 a first MSC block 170 is shown connected, by a communication link 172, to an MSC block 174. The communication link 172 would typically conform to IS-41 standards. A cloud, designated as 176, representing the public switched telephone network is connected to communicate with MSC 170. A source base station is designated as 176 and includes a call control element 178, an SDU entity 180 and ICF entity 182. Further, a channel element block 184 is illustrated. The blocks 178 through 182 communicate with each other via proprietary channels not illustrated. Call control block 178 communicates with a call control mobility management block 186 in MSC 170 via an A1 communication link further designated as 188. A switch block 190 within MSC 170 communicates via an A2 communication link further designated as 192 to SDU block 180. Proprietary links 194 and 196 allow communication between channel element block 184 and the blocks 178 and 180 respectively. A transmitter designated as 198 receives signals to be transmitted via a communication link 200. A hexagonal block designated 202 defines a cell of reliable signal transmission surrounding transmitter 198. A mobile station 204 is shown within the confines of block 202.

A switch 206 is shown within block 174. Also shown in block 174 is a call control mobility management block 208. A target base station is designated as 210. Within block 210, there is shown an ICF block 212, a call control block 214, a SDU block 216 and a channel element block 218. An A1 communication link 220 provides transmission of signals between call control block 214 and mobility management block 208. A communication link 222 provides for the transmission of enhanced A3 communications between ICF 182 and ICF 212. A proprietary communication link designated as 224 provides communications over a proprietary channel between ICF 212 and channel element block 218. A further proprietary communication link 226 provides for the interchange of signals between call control block 214 and channel element block 218. A transmitter, designated as 224, receives transmission signals from target base station 210 via a communication link 226. A hexagonal block 228 defines a cell around transmitter 224.

Figure 5:
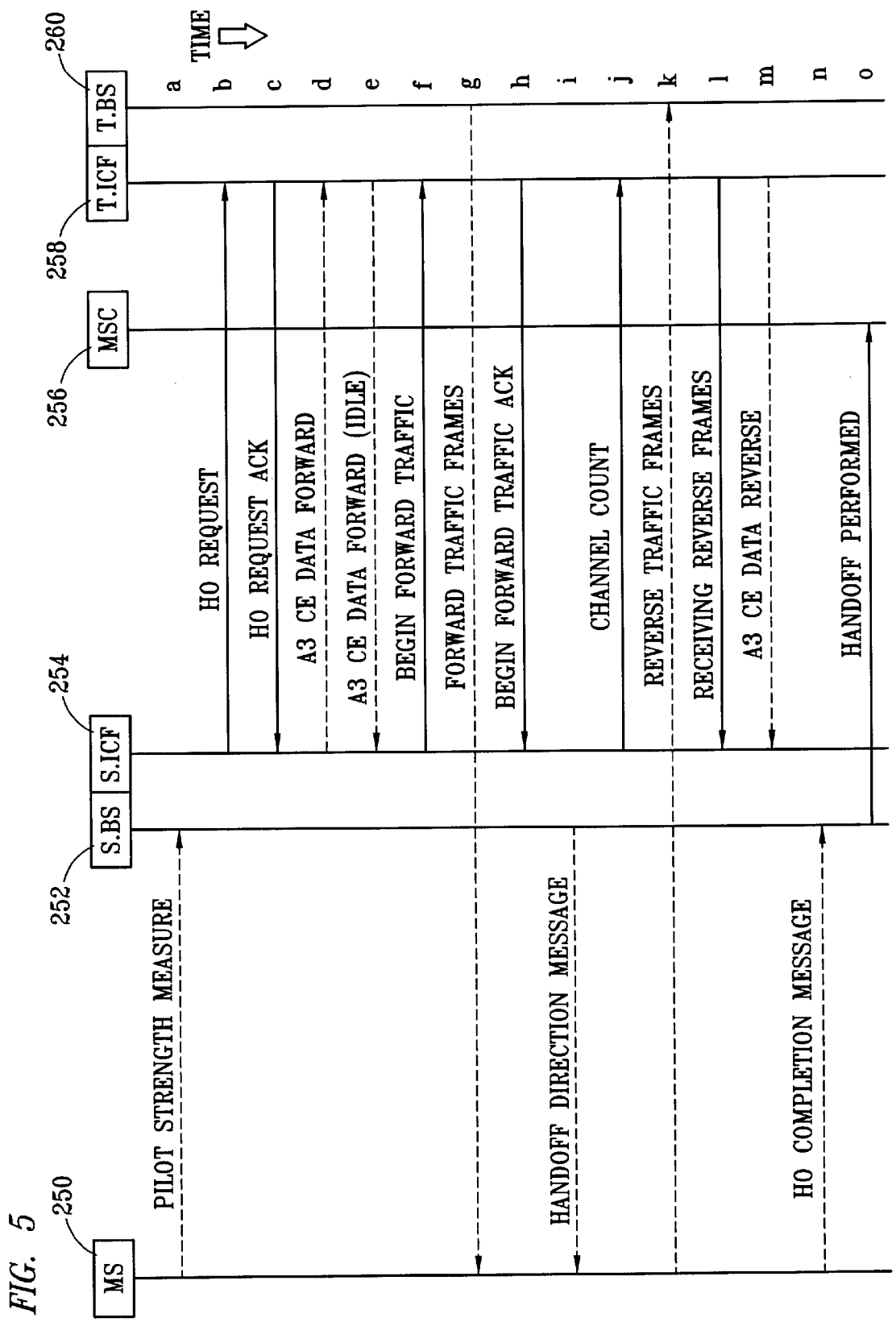
FIG. 5 illustrates, in a time sequence diagram form, a methodology of the establishment phase of a soft handoff.

In FIG. 5, a plurality of boxes are shown across the top of this time sequence diagram. A block 250 represents a mobile station such as block 142 in FIG. 3. A block 252 represents a source base station and is representative of the similarly marked box 118 in FIG. 3. A source ICF block, designated as 254, may be considered representative of a source ICF block such as 124 in FIG. 3. Block 254 is shown adjacent and considered a part of the source base station block 252 for providing a standardized protocol conversion where required. A block 256, labeled MSC in FIG. 5, may be considered representative of the MSC block 110 in FIG. 3. A target ICF block 258 may be considered representative of ICF block 146 in FIG. 3 and thus of the target base station 144. A target BS block 260 is shown adjacent block 258 in a manner similar to blocks 252 and 254. Vertically spaced designations from "a" through "o" on the right side of FIG. 5 represent consecutive times for the occurrence of the various signals adjacent to these designations.

As previously indicated, the time sequence diagram of FIG. 5 is illustrative of the messages and voice packets passed during the establishment phase of a soft handoff where both the source and target base stations are controlled by a single MSC. Such a handoff would be termed an intra-system direct BS-BS handoff and thus FIG. 5 will be used in conjunction with describing the operation of FIG. 3. It should further be realized that the messages presented in dash lines represent messages over the traffic channel whereas solid lines represent messages over a signalling channel. As previously indicated, traffic and signalling messages may be sent over the same path when appropriate header information is used in a data packet such that the ICF may distinguish the two different types of messages. On the other hand, the present invention includes the possibility of using different physical paths in the operational mode of enhanced communication link A3. Either approach would achieve the desired result of standardized communications directly between base station units for establishing soft handoff of an MS.

In connection with describing the operation of prior art FIG. 1, it will be assumed that the mobile station 40 is moving in the direction of cell 54 and receives pilot signals from transmitter 56. A mobile station 40 monitors the strength of these pilot signals output by transmitter 56, as well as any other pilot signals it may receive from other nearby cells (not shown). When the strength of a received pilot signal exceeds a predetermined threshold, the mobile station 40 transmits pilot strength measurement (PSM) messages to the source or serving BTS via a radio frequency signal traffic channel. These radio frequency traffic channel signals are received by block 34 and relayed a over communication link 36 to block 18. The PSM message is received by the BTS (not specifically shown) portion of the base station and is forwarded to SDU 22 which demultiplexes the signaling traffic from voice/data traffic, processes that signaling traffic and sends a corresponding message to the base station controller portion of block 18. A base station controller entity such as block 20 processes the message, composes a Handoff Required message and sends it to the call control mobility management block 12 of the MSC 10. This message is sent via the A1 interface communication link. As previously indicated, the desired target cell 54 is controlled by a different base station controller. Thus, after MSC 10 processes the handoff required message and composes a handoff request message, this handoff request message is sent to the target base station controller within block 42 via the A1 interface 50 as shown. The target base station controller within block 42 processes the handoff required message within call control block 46.

After block 46 processes the request message, it composes a handoff request acknowledge message and sends the acknowledge message back through the A1 interface via link 50 to the MSC 10. The MSC then processes the acknowledge message, composes a handoff command message and sends the handoff command message to the base station controller within block 18. The base station controller forwards this handoff command message to SDU 22. SDU 22 processes the message, creates a handoff direction message, multiplexes it and sends the handoff direction message to block 28. Block 28 processes the frame which contains the handoff direction message and sends it to the mobile station 40 via transmitter 34. Once the mobile station 40 receives the handoff direction message, it can start responding to signals received from transmitter 56. Once communication is established with the target base station 42, a transfer completion message is returned to MSC 10 via the target base station 42 and the A1 communication link 50.

From the above the description, it may be determined that the establishment phase of a soft handoff requires the transmission, processing and routing of messages from the MS 40, to block 28, block 22, block 20 and then block 12 of the MSC. After the message is processed by the MSC it must be then sent to blocks 46 and 48. After processing by block 48 it is returned via 48 and 46 to the block 12 in the MSC 10 before messages are returned to the mobile station 40 via blocks 20, 22 and 28. The return message indicates to mobile station 40 that the request was satisfactorily completed and a handoff direction has been provided. It may be determined that this process involves many steps and will typically consume a significant amount of time.

The inter-system soft handoff process of FIG. 2 requires two additional steps in order to pass messages through the additional MSC 72. Otherwise, the establishment phase is identical to the operation described in connection with FIG. 1.

After the mobile station 40 in FIG. 1 receives the handoff direction signal, the SDU 22 forwards all traffic signals via A3 link 52 to channel element block 48 of the target base station 42 for retransmission through the communication link 58 to transmitter entity 56. Reverse traffic is sent back in the converse manner. A similar process occurs for FIG. 2.

A similar result occurs in FIG. 2 when the mobile station 88 receives a handoff direction signal that allows it to start receiving signals from transmitter 96. In other words, traffic signals such as voice are relayed from source base station 78 through the A3 communication link 94 to the target base station 90 for transmission through transmitter element 96 to the mobile station 88.

The operation of FIG. 3 will be discussed in conjunction with the time sequence diagram of FIG. 5. It is assumed, for the purpose of this discussion, that mobile station 142 is moving in the direction of cell 164 and is receiving pilot signals from transmitter 162 operating under the control of base station 144 as well as pilot signals from transmitter 136 controlled by base station 118. The pilot signals, as known by those skilled in the art, are transmitted on non-traffic channels in systems using code division multiple access (CDMA) technology. Typically an active mobile station receives and stores information relative the strength of the most powerful signals. When the strength of a received pilot signal exceeds a given value, that mobile station, such as 142, transmits pilot strength measurement information to the base station with which that mobile station is connected. As illustrated, that base station would initially be base station 118. The mobile station 142 would typically also receive pilot strength signals from other nearby cells not shown. When the strength of a pilot signal, as received from a transmitter in an adjacent cell, reaches predetermined parameters, a handoff request is initiated.

When the handoff is to another CDMA cell, a soft handoff is attempted. A soft handoff is preferred as there is less likelihood that the call will be accidently dropped. The following description of operation of the system of FIG. 3 in conjunction with the time sequence diagram of FIG. 5 mentions operations within the base station that may vary in detail from one manufacturer to another manufacturer. These internal operations are not part of the invention but were merely included to facilitate understanding of the process by those not skilled in the art.

As shown in line "a" of FIG. 5, a pilot strength measurement message is received by the source BS block 252 (corresponding to block 118). This measurement message may contain data on pilot signal strengths pertaining to more than one cell. Within BS 118, the pilot strength measurement signal is received by block 130 and forwarded to the SDU block 122. The SDU makes a determination that it is time to request a handoff to at least one cell controlled by another BS. The SDU makes a further determination that the pilot signal has been received from a BS that uses a standardized traffic and signalling communication link. Such a determination may be made from a list of nearby systems contained within the base station. Alternatively, such information may be supplied as part of the pilot signal. Such determinations are outside the scope of this invention.

A signalling channel resource request message is sent from the SDU 122 to the ICF 124. ICF 124 (S.ICF 254) converts the message to a standardized protocol as a handoff request on line "b" of FIG. 5. The handoff request of line "b" is received by the ICF block 146 of the target base station where it is reformulated into a resource request according to the format or protocol of the target base station. If the channel element entity of the BTS, represented by block 152 in FIG. 3, has the radio resources available, a positive response is obtained. A connection request is then sent to the call connect block 148 in the target BS. A positive response from the call connect block 148 results in a handoff request acknowledge message being returned from ICF 258 to ICF 254 over the enhanced communication link 160 of FIG. 3. This acknowledgement message operates to initiate an A3 packet mode connection for user traffic and to indicate the target cell is able to join the call.

Within the source base station 118, the handoff request is returned to the format of the source base station 118 and a resource request response is supplied to SDU 122. A traffic channel is opened between base stations 118 and 144 as shown by the dash lines "d" and "e" and traffic (voice or data) is permitted to flow to the target base station. The SDU 122 then has the ICF 124 send a signalling message, as shown in line "f" to begin forward traffic. This message instructs channel element 152 in the target BS to commence sending forward traffic frames from the transmitter 162 to MS 142 as is shown on line "g" of FIG. 5. An acknowledgement message is returned to the source base station from channel element 152 as shown in line "h". This acknowledgement message indicates that forward traffic channel transmission has started.

A handoff direction message is formulated by SDU 122 in the source BS 118 and sent to the MS as shown on line "i". This message is sent on all existing traffic channel connections.

A channel count message is then sent from the SDU 122 to the target BS for the adjustment of power control of traffic signals at transmitter 162. Reverse traffic frames from MS 142 are received at this time by the target BS 144 as shown on line "k". When the target BS receives reverse traffic frames, it stops sending the idle frames of line "e" and starts sending the received reverse traffic channel frames. A signalling message is provided by channel element 152 once it has received traffic from the MS 142 in accordance with the message shown on line "l". These reverse traffic frames are supplied by the channel element block 152 to ICF block 146 and returned to the source BS for receipt by SDU 122 as shown on line "m". It may be noted that the traffic packets of line "e" were null frames to keep the channel open. A handoff completion messages (HCM) is transmitted by the MS and is received by the source base station. If the target BS has already synchronized itself with the reverse traffic from the MS, HCM containing traffic frames are received by the target BS at the same time as received by the source BS. These target BS HCMs are forwarded over link 160 to the source BS and specifically to SDU 122. The source BS processes the frames received from the two BSs simultaneously and perceives only one HCM.

After SDU 122 has received reverse handoff completion messages on the traffic channel from both the mobile station 142 and from call control block 148, the SDU 122 determines the mobile station has been successfully handed off to the target base station. SDU 122 informs BC(CC) 120 that the handoff has been completed. The BS(CC) 120 in the source BS now sends a signaling type handoff performed message to the MSC 110 as shown in conjunction with block 256 in FIG. 5 over the A2 communication link 126.

When the call is completed or the soft handoff link needs to be released for some reason, further signals must be transmitted to drop the target base station resources. This is accomplished in a manner similar to that used in the prior art except that, in accordance with the teachings of this invention, such signals would be transmitted directly between BSs rather than involving the MSC as occurred in the prior art.

For the messages involved in the establishing phase as well as in the release phase, appendix A provides an example set of message-layout and information elements.

It is thus apparent, from the above, that in accordance with this invention, the only involvement of the MSC 110 is to be advised that handoff is complete and thus MSC 110 does not interfere with the timeliness of the establishment phase of the handoff operation.

The operation of the system shown in FIG. 4 having two MSC blocks 170 and 174 controlling the adjacent cells 202 and 228 operates substantially the same as does FIG. 3 for the establishment phase of the soft handoff.

From the above, it is apparent that the elimination of the MSC from the soft handoff establishment phase requires a direct signalling link between base stations. In order for soft handoff to be accomplished under the maximum possible number of situations, the signalling messages need to be recognized by "foreign" equipment. In other words, base stations produced by different manufacturers need to be able to communicate with other base stations in a standardized manner if soft handoff of an MS is to be accomplished between local and foreign systems.

By using an ICF to output a standardized protocol set of enhanced A3 traffic and signaling channel messages, any base station capable of soft handoffs, can communicate with any other manufacturers base station that is compliant with that standard. A manufacturer may still use any proprietary protocol within the base station that is found to be cost effective for that product.

The use of a direct link between base stations reduces the likelihood that a time out will cause a call to be dropped due to excessive message transmission time. The prior art used the MSC as the distribution point for messages to a base station, whether a like or foreign system since the only standard previously established for signalling messages was between MSCs and between base stations and their controlling MSCs. The removal of the MSC from the path as taught in this description of invention does not reduce any functionality of the system. All the determinations regarding whether or not a soft handoff should occur, when it would occur and the destination cell and channel were made in the source and target base station in the prior art. Thus the only functional change is the path by which the signal messages passed.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. Base station means comprising:
   first means for translating signalling messages, intended for transmission directly to another base station, to be compliant with an established industry standard; and
   second means for translating signalling messages, received directly from said another base station and which messages are compliant with an established industry standard, to a format usable by said base station means.

2. Apparatus as claimed in claim 1 wherein said established industry standard being in accordance with IS-634.

3. A wireless system comprising:
   mobile switching center means;
   a first base station means having a base station protocol;
   means, comprising part of said first base station means, for communicating both voice and signaling messages directly with a second base station means controlling an adjacent cell; and
   means, comprising part of said first base station means, for translating received and transmitted messages between an industry standardized protocol and said base station protocol.

4. The system of claim 3 further comprising one or more signal connection means for interfacing between said first and second base station means.

5. A wireless system comprising:
   mobile switching center means;
   a first base station means having a base station protocol;
   means, comprising part of said first base station means, for communicating both voice and signaling messages directly with a second base station means controlling an adjacent cell to initiate a soft handoff, wherein said soft handoff initiation occurs without a handoff required message being sent to said mobile switching center means; and
   means, comprising part of said first and second base station means, for translating received and transmitted messages between an industry standardized protocol and said base station protocol.

6. The system of claim 5 further comprising one or more signal connection means for interfacing between said first and second base station means.

7. A method of initiating a soft handoff from a first wireless base station comprising the steps of:
   receiving a pilot strength measurement signal from a mobile station located in a cell controlled by said first wireless base station, said first wireless base station having a base station protocol;

sending a handoff (HO) request directly to a further wireless base station controlling a transmitter whose pilot signal caused said pilot strength measurement signal to be received, wherein said soft handoff initiation occurs without a handoff required message being sent to a mobile switching center;

receiving a HO request acknowledge signal directly from said further wireless base station;

sending a handoff direction message to the mobile station from which said pilot strength measurement signal was received; and translating said received and sent messages between an industry standardized protocol and said base station protocol.

8. The method of claim 7 comprising the additional step of standardizing the HO request to conform to IS-634 protocol.

9. A soft handoff mechanism for controlling soft handoff of a given mobile unit from one cell to another comprising, in combination:

a plurality of base station transceivers (BTSs) for communicating with mobile units in the service coverage area of each BTS, the plurality of BTSs including a source BTS in communication with the given mobile unit;

a direct communication link (A3) between adjacent BTSs for carrying signaling data and traffic data between BTSs;

the source BTS for receiving data from the given mobile unit indicating strength of all pilot signals received by the given mobile unit;

the source BTS establishing and maintaining signaling and traffic data communication with a target BTS, where pilot strength measurement of the target BTS exceeds a predetermined threshold, wherein communication with the given mobile unit is transferred from the source BTS to the target BTS.

10. A method for soft handoff in a wireless telecommunications system, the method comprising the steps of:

receiving at a base station controller in communication with a given mobile a signal indicating the strength of each pilot signal being received by said given mobile as measured by said given mobile;

identifying, at the base station controller controlling the communication with said given mobile, which n base stations have pilot signal measurements higher than a predetermined threshold;

establishing and maintaining traffic handling resources between each said n base stations and said given mobile; and where at least one of the n base stations are controlled by a base station controller different from the base station controller controlling the communication with said given mobile, establishing a direct link (A3) for control signaling and traffic signaling between said base station controller controlling the communication with said given mobile and the different base station controller wherein the base station controller in communication with said given mobile will receive traffic data from said given mobile unit from n different sources and can determine which traffic data has the highest quality.

* * * * *